United States Patent
Chen et al.

[19]

[11] Patent Number: 6,049,628
[45] Date of Patent: *Apr. 11, 2000

[54] POLYGON RESHAPING IN PICTURE COLORIZATION

[75] Inventors: Stan Chen, La Habra; Jack Norton, Santa Clarita; Santhanam Rajagopalan, Irvine, all of Calif.

[73] Assignee: Cerulean Colorization LLC, Santa Monica, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/525,391

[22] Filed: Sep. 8, 1995

Related U.S. Application Data

[63] Continuation-in-part of application No. 08/523,015, Sep. 1, 1995, abandoned.

[51] Int. Cl.[7] ............................................... G06K 9/00
[52] U.S. Cl. ............................................ 382/238; 382/283
[58] Field of Search ................................. 382/254, 256, 382/257, 258, 259, 266, 267, 268, 269, 275, 282, 283, 293, 294, 295, 296, 298, 299, 300, 309, 311, 168, 171, 172, 173, 175, 180, 181, 190, 209, 203, 217, 240, 241, 242, 243, 239, 286, 291, 307, 308, 310, 238; 358/517, 506, 531, 536, 537, 538, 539, 540; 348/578, 596, 661

[56] References Cited

U.S. PATENT DOCUMENTS

| | | | |
|---|---|---|---|
| 3,771,155 | 11/1973 | Hayashi et al. | 340/324 AD |
| 3,774,076 | 11/1973 | Weinger | 317/33 SC |
| 4,021,841 | 5/1977 | Weinger | 358/22 |
| 4,149,185 | 4/1979 | Weinger | 358/81 |
| 4,204,207 | 5/1980 | Bakula et al. | 340/723 |

(List continued on next page.)

OTHER PUBLICATIONS

"User Manual, Your Complete Guide to Superpaint's Tools & Features", Version 3.0, for Use with Apple MacIntosh Computers, Superpaint, by Aldus Corporation, Jun. 1993, San Diego CA, Aldus Corp., Consumer Div.: Page Indicating the Published Date of the Reference.

"User Manual, Your Complete Guide to Superpaint's Tools & Features", Version 3.0 for Use with Apple MacIntosh Computers, Super Paint, by Aldus Corporation, Jun. 1993, San Diego, CA, Aldus Corporation, Consumer Division, pp. 2–3 to 2–5, 2–10 to 2–21, 3–4 to 3–23, 4–115 to 4–124, 4–190 to 4–200, 4–147, 4–151, 4–208, 4–175, 1–3, Cover Pages, Table of Contents.

*Primary Examiner*—Bijan Tadayon
*Attorney, Agent, or Firm*—Oppenheimer Wolff & Donnelly LLP

[57] ABSTRACT

Polygon reshaping methods either add or subtract sides of lines of a polygon around an object of a digitized frame of picture stock. A line may be added by selecting a line of a polygon and adding a point to the line, thereby defining two lines with the point as their vertex. The point may be move along the line and away from the line to create an angle between the two lines on either side of the vertex. A line may be subtracted from a polygon either by selecting a line of the polygon and simply deleting it or by selecting a vertex of the polygon and deleting the two lines which shared the vertex. In the former line-removal case, the now-free endpoints of the lines adjacent to the removed line are moved and connected at a point defined along the removed line. In the latter vertex-removal case, a new line is drawn between the now-free endpoints of the lines which were respectively adjacent the removed lines. Any of the changes made to a particularly polygon may be propagated or interpolated through other frames of the shot.

6 Claims, 6 Drawing Sheets

U.S. PATENT DOCUMENTS

| | | | |
|---|---|---|---|
| 4,156,237 | 5/1979 | Okada et al. | 340/701 |
| 4,356,511 | 10/1982 | Tsujimura | 358/181 |
| 4,357,624 | 11/1982 | Greenberg | 358/22 |
| 4,360,831 | 11/1982 | Kellar | 358/182 |
| 4,420,770 | 12/1983 | Rahman | 358/183 |
| 4,509,043 | 4/1985 | Mossaides | 340/721 |
| 4,606,625 | 8/1986 | Geshwind | 352/38 |
| 4,642,676 | 2/1987 | Weinger | 358/22 |
| 5,050,984 | 9/1991 | Geshwind | 352/38 |
| 5,237,647 | 8/1993 | Roberts et al. | 395/119 |
| 5,412,770 | 5/1995 | Yamashita et al. | 395/142 |
| 5,434,959 | 7/1995 | Von Ehr, II et al. | 395/141 |

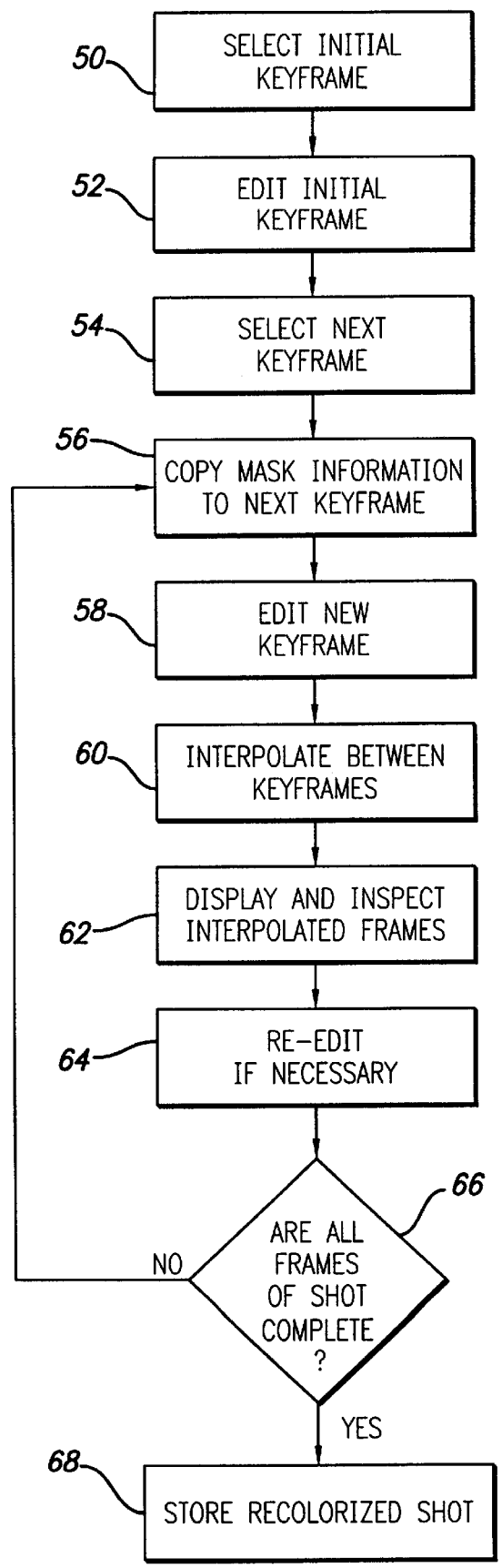

POLYGON RESHAPING IN PICTURE COLORIZATION

CROSS REFERENCE TO RELATED APPLICATIONS

This application is a continuation-in-part of U.S. application Ser. No. 08/523,015 entitled PICTURE RECOLORIZATION filed on Sep. 1, 1995, now abandoned, by the same inventors of the present invention.

BACKGROUND OF THE INVENTION

1. Field of the Invention

The present invention relates to computerized film reprocessing techniques and, more particularly, to polygonal masking techniques used in picture colorization.

2. Description of Related Art

Film colorization, that is, colorizing black-and-white motion pictures, turned the film industry on its side in the mid-1980s. With less than adequate color selection and limited hardware and software capabilities, early attempts at colorizing notable black-and-white-film classics such as "Casablanca" and "The Big Sleep" produced less than favorable results, resulting in muddy hues that didn't always stick to the objects they were meant to color. Indeed, many film purists likened colorization to vandalism and defacement. However, in the 1990s a demand was created by the skyrocketing cost of producing new movies and television shows coupled with the burgeoning demand for movies and television shows to fill up time slots on the 500 or so cable channels, a demand which has been an incentive for colorizers to advance their craft to much higher levels of quality.

Colorizers have also applied their craft to more varied fields, fields which do not necessarily involve original black-and-white picture stock. For example, in the past if a director of a picture were unhappy with the color of a particular shot, the director would have had to reshoot the shot, which would have incurred high production costs. Further, commercial artists and advertisers may desire to intensify particular aspects of television commercials to be more appealing to consumers of target markets. Other special color effects may also be desired for a particular film, video, or television show, particularly music videos which are often intended for the less conservative teenage and young adult audience.

Those associated with picture colorization understand the amount of time and effort required to colorize or recolorize a picture. For example, after a picture is digitized, segmented into shots consisting of any number of individual frames, and stored on a database, colorists and other skilled personnel spend countless hours "masking" objects which entails drawing polygons around objects such as actors, animals, and so on, which objects are substantially homogeneous in color.

There are many times when these polygons need to be adjusted during the course of colorizing a particular shot. For example, if as a shot progresses an object such as an animal moves from the background of the shot to the foreground or vice versa, the shape of the object changes, and, therefore, the polygon around that object will need to be changed. Polygons typically require more lines to accurately mask the object while the object is in the foreground as opposed to the background. Therefore, as the shot progresses, the user has to reshape the polygon around the object in order to maintain an accurate mask of the object, thereby requiring much time and effort.

Accordingly, it is an object of the present invention to provide polygon reshaping techniques which enable a user to alter or modify existing polygonal object masks with increased efficiency and productivity.

SUMMARY OF THE INVENTION

Polygon reshaping technology of the present invention provides a method for modifying the shape of polygonal object masks of digitized picture stock by adding or subtracting lines or sides of the polygon. Generally speaking, polygonal reshaping provides a method for reshaping mask polygons of a frame of picture stock by firstly digitizing the frame and then either identifying at least one polygon of the frame or creating a new polygon. A vertex or a line is identified from which point either the vertex is removed, the line is removed, or a vertex is added to the line and adjusted. The modified digitized frame may then be stored in a database and converted back to a desired picture stock.

More specifically, a polygon which is to be modified is digitized and stored in a computer system. The original film stock may be of any known form and of any length, e.g., from a single frame or art still to an entire feature length film. The digital data from the digitized picture stock is divided or segmented into individual shots and frames, if necessary. A user then downloads a digitized image file, i.e., one frame of the picture, to a computer workstation system. Polygons of the image file to be modified may now be modified.

According to one aspect of polygon reshaping is that a line is added to the polygon by adding another vertex to the polygon. A user selects a desired line and the compiler adds a point to the line with the point defined as a new vertex, thereby defining two lines on either side of the point. The user may drag the point along the line to a desired position and may drag the point out of the line, thereby creating an angle, i.e., a vertex, at the point.

Another aspect of the present invention is that a point or a vertex of the polygon is removed, thereby reducing the number of the sides of the polygon by one. In this case, a user selects a vertex, thereby selecting the two adjoining lines which share the vertex, and the compiler removes these two lines. By removing the lines, two endpoints of the respective lines adjacent to the removed lines are now free. A line is then drawn between the two endpoints, thereby closing the polygon.

The present invention has another aspect in that a single line may be removed by a user selecting a line and the compiler removing the line, thereby leaving the endpoints of the two adjacent lines free. The two endpoints are then moved and connected at a point on the line which was removed, preferably at the point where the midpoint of the removed line was defined to be, which point may now be adjusted as desired by the user.

One of the advantages of the polygon reshaping technology of the present invention is that a user may propagate and interpolate these described polygon changes through the other frames of the shot, thereby saving time and effort. For example, an object in an early frame of a shot may be in the background and defined with only five lines in the polygon. But as the shot progress, the same object moves to the foreground and needs to be more accurately defined with more lines. A user may add those lines to a later shot and interpolate the shape of the polygon in the intermediary frames rather than adjusting or modifying the polygon in each intermediate frame manually.

Other aspects, advantages, and features of the polygon reshaping technology of the present invention will become

BRIEF DESCRIPTION OF THE DRAWINGS

FIG. 3 is a block diagram illustrating a frame interpolation process used in a colorization process according to the present invention;

DETAILED DESCRIPTION OF THE PREFERRED EMBODIMENTS

Figure 1:
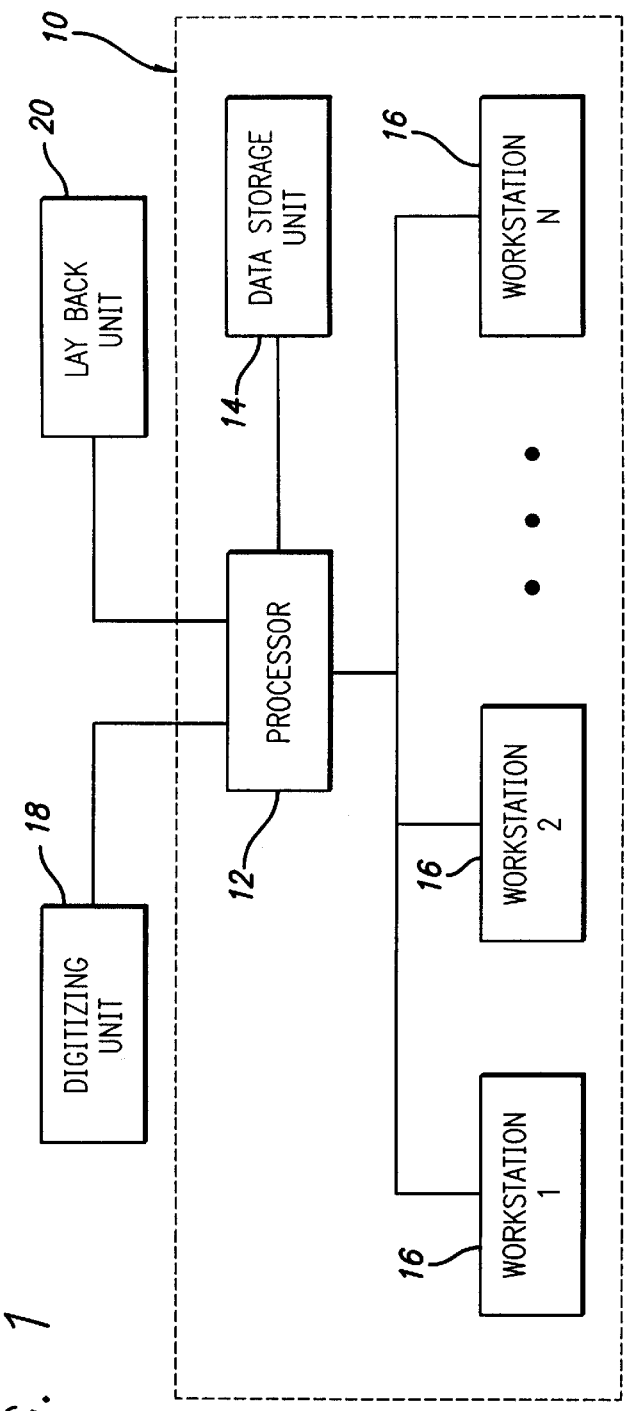
FIG. 1 is a block diagram of a multiple workstation computer recolorization network illustrating certain principles of the present invention.

Referring to the drawings, exemplary embodiments of the present invention are shown, illustrating the principles of picture recolorization. Upon reading the following detailed description with reference to the accompanied drawings, those skilled in the film and colorization arts will come to realize various alternative and modified embodiments of those exemplified and described herein. This description provides a foundation of picture recolorization from which these alternatives and modifications stem. Accordingly, rather than provide an exhaustive description of all possible preferred embodiments envisioned by the inventors, the principles of the present invention are exemplified with only the embodiments illustrated by the attached drawings and elucidated by the following description.

FIG. 1 generally shows a multiple workstation computer network 10 including a central processor unit 12 such as a mainframe computer in communication with a data storage unit 14 and a plurality of terminals or workstations 16. Each of the workstations 16 may have any combination of the user interface devices available on the market, but it is preferable for each workstation 16 to include at least a keyboard with a mouse and a video display. Digitization pads and the like may also be employed in the workstations 16. The data storage unit 14 may take on any desired form available on the market, but as colorization processes require large amounts of data storage space, the data storage unit 14 should be capable of storing data on the magnitude of thousands of megabytes (or gigabytes) or millions of megabytes (or terabytes). The market currently provides either magnetic tape storage systems, magnetic disk systems, or optical disc systems which are capable of storing such voluminous capacity. It follows that it is preferable for the main processor 12 to have data compression capability to efficiently handle this large amount of data. Furthermore, each workstation 16 as well as the processor 12 preferably has dedicated random-access memory (RAM) capability for further efficient use of the picture recolorization process disclosed herein.

In a commercial implementation of the picture recolorization technology of the present invention, the color-on-color network 10 may be broken down or segmented into dedicated function groups or "work bays" in which personnel performing similar tasks in the recolorization process are located. For example, colorists, that is, artists or other skilled animators who are experts on color, may be assigned a certain number of workstations 16; users who are skilled in the task of masking or drawing polygons around objects to be recolored may be assigned to a number of workstations 16; and users who are skilled in the algorithmic function of interpolating, which is an efficiency function of estimating or fitting color and mask data to unedited frames of a film, may be assigned to further workstations 16. In any case, any number of defined function workstations 16 may be manipulated by colorists and users in an efficient orchestration of the recolorization technology disclosed herein.

At this point a number of definitions of terms in the art will be given in order to allow those people not specifically skilled in the art to understand more fully the principles set forth herein. The concept of color is defined by a combination of the three following qualities: hue, which indicates the gradation of color or the attribute of colors that permits them to be classed as red, yellow, green, blue, or an intermediate color between any contiguous pair of these colors; intensity, which relates to the density or brightness qualities of a color; and saturation, which relates to chromatic purity (i.e., freedom from dilution with white) or the degree of difference from the gray having the same lightness. Additional words used in the art of colorization include: luminance, which relates to the black-and-white aspect of a frame; and chrominance, which is the hue and saturation component of a color. When speaking of movies or films and videos, picture indicates a generic term for any motion picture including movie, film, video, or the like; frame refers to a single instantaneous exposure of film of the series of exposures on a length of a picture; and shot refers to an unedited or continuous sequence of frames between edited breaks or cuts of the picture (i.e., "scenes" in a picture) or, in other words, an unbroken view of a given scene from a single camera perspective.

More industry-specific terminology includes: diffusion, which relates to the blending or grading of color at the border of two differently color objects; precedence, which determines which objects in a frame are more forward or rearward (i.e., closer or farther from a view's perspective) than other objects; and baseplane which is the background plane or the most rearward object to be masked in a frame.

The definition of the concept called colorspace is somewhat more complicated than those already given. Color television and color computer monitors (i.e., display units and monitors) normally operate in RGB colorspace, RGB standing for the additive primary colors red, green, and blue. These three colors correspond to the three "guns" of color displays and, in addition, roughly correspond to the three types of color receptors in the human eye. As colorization processes add color to existing monochromatic images or modify color of polychromatic images as set forth herein, the colorspace known as "YCrCb" is preferably chosen for internal representation and manipulation because YCrCb colorspace separates luminance information from chrominance information.

In YCrCb colorspace, "Y" represents the monochrome or the luminance portion of the image, and "Cr" and "Cb"

respectively represent the red portion and the blue portion of the color image, which are read as "red chrominance" and "blue chrominance." [The color green is not stored because green can be algebraically computed from the other three colors, which is known in the art.] In order to visualize the concept of YCrCb colorspace more clearly, if the Cr-Cb space were displayed in two-dimensional Cartesian coordinates, gray would be in the center (0,0) with the Cr and Cb values both equal to zero. The further from the origin that a point may move (i.e., the Y or luminance value) the more progressive the intensity of the color would become, with the hue of the color being defined as the angle with the origin as its vertex. In addition, a color recipe is a set of luminance points, which includes at least black and white, for any given substantially homogeneous color area or mask.

Having provide these basic colorization terms and concepts, picture recolorization technology according to the present invention generally entails a method for modifying the color of existing polychromatic or color picture stock with luminance-to-chrominance mapping techniques. Generally speaking, picture recolorization provides a method for modifying colors of a frame of polychromatic picture stock by firstly digitizing the frame and then identifying at least one area of the frame which is substantially homogeneous in color. At this point, the luminance values of each digital unit, e.g., a pixel, of the substantially homogeneous area are ascertained, with the luminance values mapped to a predetermined set of color values. The luminance values are then modified as desired by a colorist to create a particular effect. The modified digitized frame is then converted back to a desired picture stock. All of these tasks may be accomplished at the various dedicated workstations 16 of the recolorization system 10. The substantive description of the present invention now follows.

Digitizing Picture Stock

Figure 2:
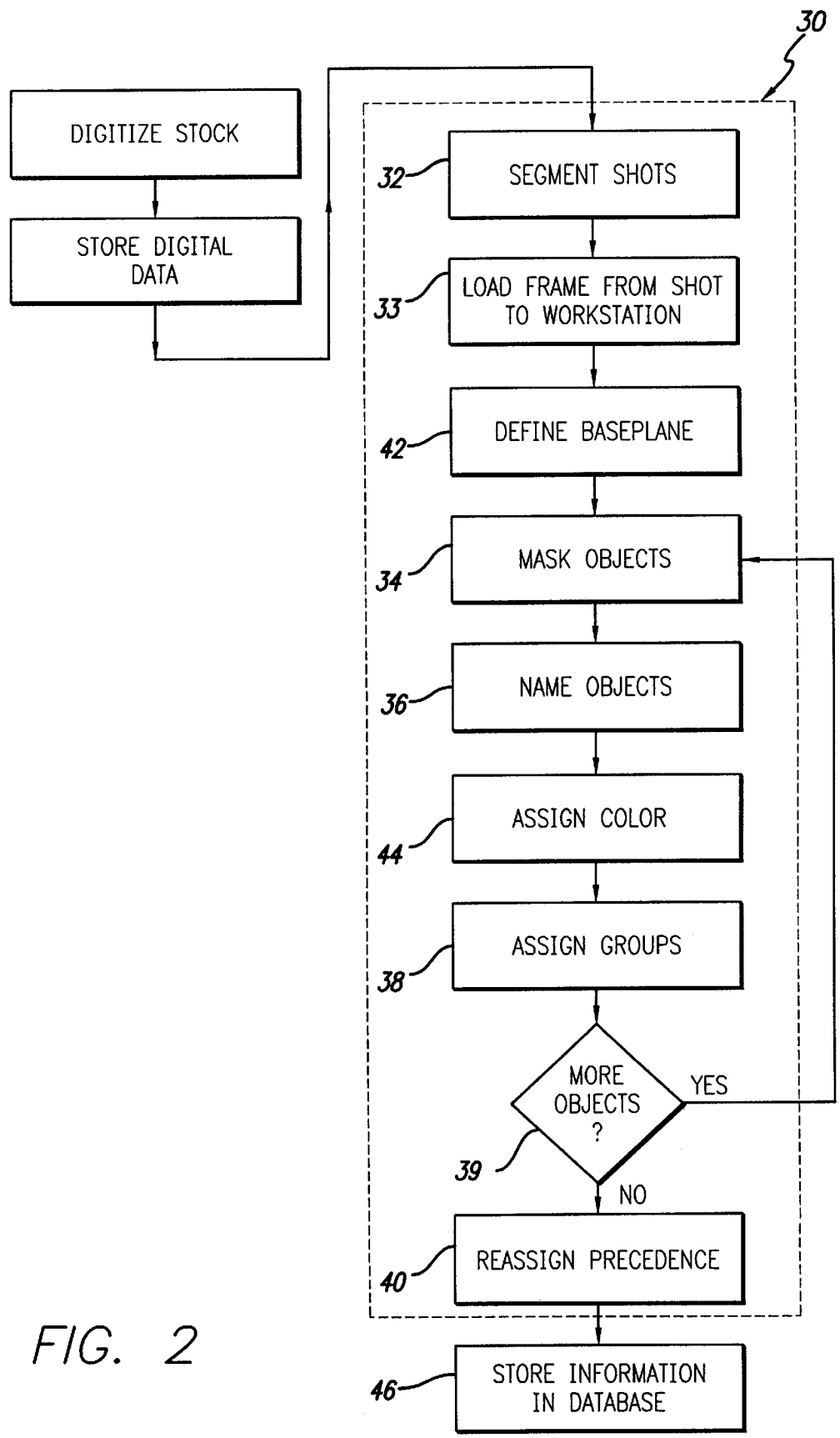
FIG. 2 is a block diagram illustrating a colorization process for picture stock, particularly showing the creation of a picture database.

With additional reference to FIG. 2, the colorization of black-and-white pictures or the recolorization of the color pictures, in a general sense, firstly involves capturing, which is the process of digitizing, frame by frame, picture stock with a digitizing unit 18 into individual pixels or digital units as shown in FIG. 1 and represented by block 22 in FIG. 2. The original stock may be any known monochromatic or polychromatic type of picture stock, including celluloid motion picture films, television series or films (for example, 4,096 lines per frame), television commercials, music videos, and so on. Further examples of source media include RGB-format videotape, D1 digital videotape, NTSC videotape (i.e., videotape with 525 lines per frame), PAL videotape (i.e., 625 lines per frame), analog and digital videotape in general, and even single art still and photographic slides as well. As the stock is digitized frame by frame in the digitizing unit 18, the data are transmitted to the processor 12 of the computer network 10 and stored in the data storage unit 14. If the original stock is celluloid or a video master print, then it is preferable to transfer this valuable stock to D1 videotape first so that the original celluloid or video master is left untouched by the digitizing unit and completely intact for archival purposes. At any time in the colorization or recolorization process, the digital data contained in the data storage unit 14 may be laid back or converted to a desired form of picture stock or the original form of the picture stock by a lay back unit 20, which will be discussed further below.

Creating a Database

Once the digital data from the digitized film stock 22 is stored in the data storage unit 14, as represented by block 28, a database is created as shown by block 30. The digital data stored in the storage unit 14 represent the entire film, video, or movie, which is essentially an summation of identifiable continuous shots. Accordingly, the digital data are segmented into each original individual shot, as shown by block 32, with each shot identified. Each shot in turn is essentially a set of individual continuous frames which have been taken from a given camera perspective and have a shared set of objects and/or characters, which may or may not move about the frames during the course of the shot. Each frame may then also be thought of as a collection of these objects, which may be actors and actresses, animals, automobiles, trees, fixtures, and so on. After the shots are segmented 32, a frame from the shot is downloaded to one of the workstations 16 so that a colorist may work thereon, as represented by block 33.

A baseplane is an object with a color recipe which covers the entire frame and is at the lowest precedence, e.g., precedence 1. The baseplane is typically the "background" (for example, the sky, the ocean, or the wall of a room) across which all other objects move or of which all other objects are in front. By defining a baseplane (block 42), the overall color to be applied to a frame may be quickly applied. The baseplane may be defined essentially at any point in the process, often beneficially immediately after the frame is downloaded 33 to the workstation 16 and a colorist is commencing work thereon.

A process called masking takes each of these objects and delineates a certain definable color region, which is called a mask and shown by block 34. Objects to be masked are generally selected from each frame based upon homogeneity of color; that is, the object has substantially the same color throughout, or the color of the object is substantially constant throughout. The selected and masked objects may then be assigned names (block 36) for consistent reference throughout the colorization or recolorization process. As can be realized, some objects may be a combination of several masks. For example, if the object in question is a person, then the various required masks would include the person's shirt, pants, shoes, face, hair, hands, and so on. This process is called grouping and is represented by block 38. Therefore, each object may be thought of as a group of masks. Grouping allows parallel or simultaneous editing of related masks which increases productivity of the colorist working at one of the workstations 16. Further, by combining the masked objects or elements of a principal object into a unified group for functions such as moving and resealing, the colorist can reduce the amount of operations required to track objects in motion.

In a preferred embodiment of the present invention, there may be, for example, 1,024 possible masks available per frame of footage (footage being defined as a series of frames which typically appear at a rate of 24 frames per second in motion pictures). Accordingly, many of the commands for editing masks (which will be discussed in detail below) may be performed on a group of masks and not each individual mask, thereby greatly reducing the amount of manual labor required to edit frames with a user operating a computer mouse, for example.

In addition, a colorist may also define hierarchically masks within a given group, allowing the colorist to manipulate subgroups of a principal object. However, skilled colorists typically mask objects, after defining the baseplane, from most rearward to most forward in the frame, thereby automatically assigning hierarchical precedence values to the masks. However, if desired, the precedence may be reassigned (block 40) before the frame data are stored in the database.

Masks are typically generated or defined by drawing polygons, i.e., closed plane figures bounded by at least three straight lines, around the substantially homogeneous color region or area of each object. As can be realized, using more lines for the defining or masking of a polygon results in a more accurate tracing or definition of the subject object. Any operation which defines a substantially homogeneous color region of a frame may be considered a masking operation, including splining techniques and specifying vertices that correspond to specific pixels or digital units in the object image.

Each of the object masks and/or each of the masks included in a mask group of an object is then assigned a color or color recipe, as shown by block 44. Color assignment 44 is a step typically performed by colorists who are artists or other specially trained animators. For example, in colorizing an old black-and-white film, the colorists have to research what color a particular costume would have been at the time the film was made or the era in which the film takes place. Accordingly, a colorist or art designer designates the colors in a select number of frames which are representative of images necessary to establish the artistic look of the entire film or project. These colorists rely on extensive reference materials such as color research books, photographs, set and costume information, and archival files from a movie studio or the Academy of Motion Pictures Library. All this information plays an integral part in the decisions regarding color.

In designating or assigning the color of the masked objects in selected representative frames, the colorist assigns chrominance values or a color recipe to every mask, each of which may have the same color recipe or a different color recipe, thereby creating "art stills" from the frames for each shot or scene. Individual colors are selected from a palette of approximately 16.8 million colors. These colors comprise a color wheel defined by luminance and chrominance values in which a colorist may operate to generate a specific desired color. Once each object is assigned a color 44, this color information as well as all of the rest of the information heretofore defined by a user at a workstation 16 is stored in the database in the data storage unit 14, as shown by block 46. Accordingly, the recolorization process is able to modify colors of films that were originally undesirable. However, the recolorization process of the present invention creates intentionally unrealistic colors for special effects or to correct flawed colors of specific objects. Furthermore, the picture recolorization technology of the present invention recolors or selectively alters existing colors of pictures that were originally in color and not necessarily in black and white originally.

Masks may be assigned an attribute known as diffusion which relates to the falloff of values along the border of the mask (i.e., along the lines of the defining polygon), or the merging of two different colors assigned to adjacent masks. Diffusion "softens" the borders or edges of the mask, allowing for smoother blending or grading of the colorization effect of the object with the surrounding objects. Diffusion further allows a user to assign a color recipe to a blurry or out-of-focus object such as smoke which would otherwise be nearly impossible to colorize accurately and convincingly.

To diffuse a selected mask of an out-of-focus object, each pixel or digital unit in the mask is replaced with the proportion of the pixels in a box centered on the given pixel that are inside the outline or polygon of the mask. This assigns the border of the mask (i.e., polygon) a value of about 0.5 which gradiently increases to 1.0 for a pixel a distance of about one-half of the defined box inside the mask, and which gradiently decreases to 0.0 for a pixel an equal distance on the outside of the mask. The size of the box determines the level or degree of diffusion, which is controlled by the colorist at the workstation 16. During the actual color application, the diffused value is used to determine the portion of the existing color for a given pixel that is replaced by the color from the colormap of the mask in question. This results in one half of the color of the polygonal mask at the border thereof comes from the mask itself and the other half comes from any mask "behind" the mask in question, which may be either the baseplane or another mask having a lower precedence value.

Diffusing the color of masks in this manner provides many advantages. First of all, a user has the ability to color blurry and out-of-focus objects realistically and convincingly. More importantly, diffusion greatly reduces the accuracy required by the user or colorist in drawing polygons around objects, mainly because the receptors in the eye that detect edges are monochromatic, and the color receptors of the eye have comparatively poor spatial resolution. It has been found that this diffusing masking effect allows a colorist to color most human faces with only six points or vertices of a polygon (i.e., using only a hexagon). A further advantage of diffusion is the simulation of realistic light reflection and highlights along the edges of curved objects, resulting in particularly realistic colorization of faces.

After an initial object in the frame has been masked and assigned a color, the colorist may continued the masking/assigning color process for as many objects as desired, as shown by decision block 39 of FIG. 2.

As mentioned above, masks may be reassigned a precedence value, as represented by block 40, which allows masks to overlap each other without interference as the masked objects move relative to each other in prior or subsequent frames. This allows efficient tracking of an objects's motion as the object moves spatially from frame to frame within a scene or shot, possibly occluding other objects in the frame. The ability to overlap masks increases the colorist's efficiency as objects change position in each subsequent frame. For example, if a particular shot involves a series of frames with a ball moving behind a tree, the tree mask should be assigned a higher precedence than the ball mask so that the ball mask can move behind the tree in succeeding frames without changing the shape of the mask or without the ball interfering with the tree. Without this precedence system, masks would have to fit together like jigsaw pieces which would require their shape to be changed by the colorist with each subsequent frame. Such a process would require tremendous user effort and time.

Blocks or steps 32 to 46 have been described in an exemplary order but may in reality take place in any order as desired by a user utilizing one of the workstations 16 of the computer system 10. In addition, once a frame has been downloaded (block 33) to the workstation 16, any one of the steps or any combination of the steps may be implemented by a user, with that particular information created by the user saved or stored in the database 46. Furthermore, this process may be implemented by a group of users at the workstations 16 with individual users dedicated to a particular task; for example, one user would only segment or separate shots 32 and then store this information in the database 46, and another user would then access this stored shot information to perform the masking of objects 34 and the naming of objects 36, thereafter storing the masking information in the database 46 in the data storage unit 14. Colorist would then perform the sophisticated and artistic process of recolorization. This information may then in turn be accessed by any number of users at the workstations 16 to perform the various tasks outlined by the block diagram of FIG. 2.

Upon completion of the database or any portion of the database which has had color assigned to the object masks 44, the following recolorization technology may be implemented.

Luminance-to-chrominance Mapping

The application or assignment of color to masks of the frame images is done with a proprietary luminance-to-chrominance mapping. In the case of colorizing black-and-white-source material, luminance is derived from the range of gray values in the black-and-white-image. In the case of modifying the color of a mask in a color frame, luminance is derived from a weighted average of the color components. The amount of luminance resolution is dependent on the number of bits used for sampling the source image. For example, 8-bit sampling yields 256 levels of gray, while 12-bit sampling yields 4,096 levels of gray.

The basic source of color for the colorization system is the colorspace or colormap, which is a complete and continuous mapping of luminance to chrominance. For every luminance value from black to white, the colormap contains the chrominance values that could be applied. However, because of the large number of luminance values representable, which may be at least 256, it would be quite tedious for the user to create a colormap from scratch. Therefore, the colorization system has a higher-level abstraction called a color recipe, which is a set of luminance points which includes at least black and white and which the compiler 10 uses to generate a colormap. In other words, the color recipe allows a colorist to specify the color for selected points on the luminance range and have these selected points influence color assignments of nearby luminance values.

The luminance values of every pixel or digital unit a mask which is substantially homogeneous in color are determined. This may be accomplished by integrating the area of the mask and generating a histogram. The resulting histogram displays by percentage the number of pixels or digital units having a particular luminance or intensity value. The colorist can then accurately determine the chrominance values of the mask in question. A colormap may then be generated based on the histogram from which the colorist may modify the luminance values or the chrominance values of the mask to a very specific degree when applying these modified values to the mask, thereby modifying the color of the mask to a specific degree. Further, by integrating the luminance values, the colorist is able to determine what range of chrominance values are viable choices for assigning to the mask.

By interpolating the color values of the color recipe, the specific chrominance values applied to a given luminance value are determined. Assuming Y (luminance) values run from 0 to 100, and Cr and Cb (chrominance) values run for −50 to 50, an example of a complete color recipe may be as follows:

TABLE I

| Y | Cr | Cb | Color |
|---|---|---|---|
| 0 | 0 | 0 | black |
| 20 | 20 | −20 | brown |
| 50 | −20 | −20 | green |
| 80 | −20 | 20 | light blue |
| 100 | 0 | 0 | white |

If the color recipe of Table I were created by a colorist at a workstation 16 of the computer system 10, the colorist would first generate a colormap from the color recipe by interpolating all the intermediate Y values or a line of intermediate Y values not already represented. For example, in the above case, the colormap would contain the following entries halfway between the entries in the recipe:

TABLE II

| Y | Cr | Cb | Color |
|---|---|---|---|
| 10 | 10 | −10 | dark brown |
| 35 | 0 | −20 | greenish-brown |
| 65 | −20 | 0 | aquamarine |
| 90 | −10 | 10 | very light blue |

However, for every luminance value there may not necessarily be chrominance values which apply. For example, if a colorist desires to alter the color of an object having an extremely bright yellow color to be a deep forest green, the luminance value would be too high or "bright" for any combination of chrominance values to yield the desired deep forest green color. Therefore, the luminance value would need to be modified, specifically decreased, in order to implement the desired effect. This is called luminance-to-luminance mapping or luminance modification. Accordingly, luminance modification remaps selected luminance ranges. This allows both inverse mapping of luminance as well as linear redistribution of luminance values. Luminance modification further enables a colorist to put any desired color in a mask regardless of the initial luminance value of the mask, or to increase the contrast of a washed out area of a mask, e.g., from overexposure.

A given digital unit of a mask may have the attribute of transparency which specifies for a given luminance value what portion of the color from a mask behind or having a lower precedence than the mask in question is retained, even in undiffused areas of the polygonal mask (e.g., the center). Transparency allows the specified luminance range to have no color applied at all. Under conditions where an object's luminance contrasts with the surrounding area, "loose" masking (i.e., less perimetrically accurate masking, or masking with a polygon having fewer sides) may be used, thereby reducing the amount of time and effort applied by a user. The luminance range of the surrounding area can be set as transparent with the effect of color application only to the object of interest. The transparency level may also be interpolated with surrounding color recipe points. Normally it is preferable for transparency to be zero which prevents the color of lower-precedent objects to be seen in the mask in question. However, there are at least two instances, for example, where transparency is very useful, the first when assigning color recipes to masked objects that are themselves transparent such as smoke and glass. The second useful application is less obvious as discussed below.

There are times when objects in a shot or scene stand out in great contrast to the background or baseplane, for example, a brightly lit face against a dark room or a shadowed face against a bright sky. In these special cases it is convenient to use a loose mask around the object and to use a color recipe to separate the foreground from the background. Referring to the bright face example, a colorist at a workstation 16 would set high luminance values corresponding to the bright face to have skin color with no transparency while setting lower luminance values corresponding to the dark room to have no color but full transparency. In the example, the polygonal mask could extend well outside the face because it would have no effect on the lower luminance areas, thereby greatly reducing the effort of the colorist.

Defining an Initial Keyframe

Figure 4:
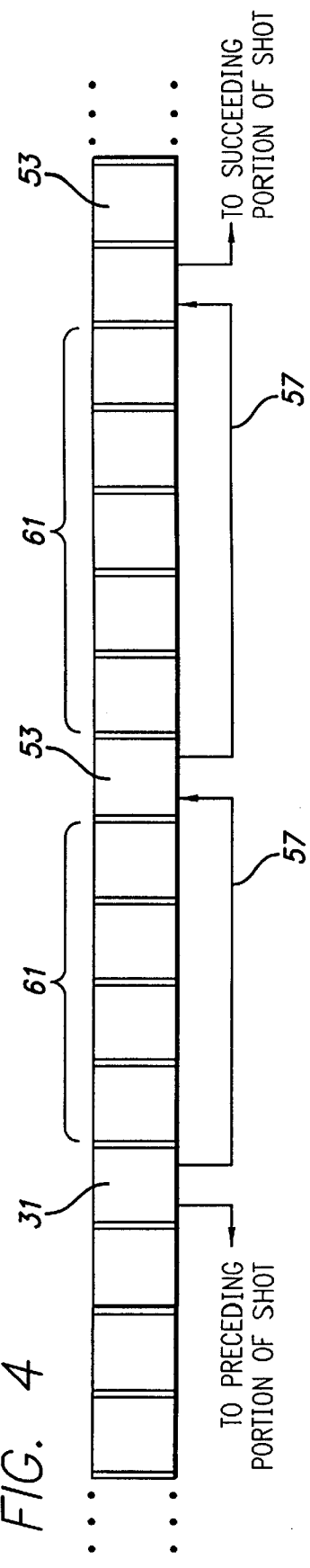
FIG. 4 is a schematic diagram illustrating a frame interpolation process of the present invention.

Referring to FIGS. 3 and 4, after the colorists have defined and assigned colors or chrominance values for each mask of each object 44, thereby creating the art still for that particular shot, an initial keyframe 51 may be selected and defined (block 50) from a defined shot in the database which is essentially the "prototype" for all the other frames in that shot as shown in FIG. 4. The initial keyframe 51 does not necessarily need to be the first frame of the shot. However, the initial keyframe is preferably the most representative or indicative frame of the shot, that is, includes most if not all of the defined and masked objects in the most indicative arrangement of the shot as possible. The different mask values of the art still stored in the database as defined by the colorists may then be copied to the initial keyframe 51. Alternatively, the colorist may mask objects himself or herself at this time and only copy previously defined color recipes to that masked object. These tasks are known as editing tasks and are represented by block 52.

The mask grouping and assigned precedence of the masks in the initial keyframe ensure efficient processing throughout the shot. With judicious initial assignment of the mask precedence, a user is able to fit masks to objects with a minimum of further precedence changes. All mask manipulation functions can be accessed on a group level, including precedence changes. Further, any frame in any shot may be saved for use as a reference in another shot, which is useful, for example, when a pair of shots alternate back and forth as a result of the film editing. Further, this saving feature allows colors and masks to be copied to the current frame which is being edited. The colors and masks of a particular frame may be copied singly, in groups, or in totality.

A dedicated file for the initial keyframe 51 may then be stored in the system 10, which file has all the information about coloring that particular frame, including the shape, position, and color recipe of all the polygonal masks. Essentially this frame becomes an anchor, providing a frame of reference for similar frames on either side thereof.

Interpolating a Set of Frames in a Shot

In order to increase user efficiency in colorizing a particular shot, the areas of the masks of a frame may be interpolated on a frame-to-frame color conversion basis. Having defined 50 the initial keyframe 51, a user may define further keyframes 53 (block 54), either forward or backward from the initial keyframe 51, which are representative of a particular sequence of frames of the shot.

The second keyframe 53 is chosen and colored with the same mask information as the initial keyframe 51 by copying the information from the initial keyframe file 51 to this keyframe (block 56 and arrow 57 of FIG. 4). If the camera taking the particular shot or if objects within the shot have moved, then the same mask/color information will not exactly fit. However, the effort required to edit the next keyframe 53 by adjusting the incorrectly matching polygons (and possibly deleting objects or masks no longer in the shot and creating new masks) is far less than if the colorist had to start each frame from scratch. The compiler 12 may then interpolate (block 60) the masks over the intermediary frames 61 between specified keyframes. The interpolation may be linear or some other user-specified mathematic algorithm. The precedence of the masks may also be changed at the various keyframes.

When at least two keyframes have been assigned mask information, one of the intermediary frames 61 located halfway between the two keyframes 51 and 53 is copied with the mask information averaged from the two bounding keyframes 51 and 53. Linear interpolation is preferably used on the absolute position of each pixel or digital unit in each mask to determine the corresponding pixel in the intermediary frame 61 in question. Accordingly, the intermediary frame or frames 61 will most likely require less editing than the next selected keyframe. This process of recursively splitting ever-shrinking spans of the shot is repeated until there are no further modifications needed or, until the experienced colorist feels that when all the remaining frames are interpolated and colored, the error in the result will not be detectable, which may be done by displaying and inspecting the interpolation result (block 62) on the display monitor at the workstation 16.

The receptors in the human eye which are sensitive to color have a relatively slow response time, allowing errors that are visible in a still frame to be unobservable at a normal rate of playback. For this reason, all recolorized material is checked for masking errors at normal speed to ensure that unnecessary work is not performed. It turns out that this technique, combined with the fact that there is actually very little change between successive frames of motion picture, allows the colorist to actually only touch on average one frame in five frames of actual material. However, the colorist may re-edit the keyframe or make new keyframes from the interpolated frames if needed (block 64).

An actual shot-editing process may proceed as follows. An initial keyframe 51 is selected with the color and mask information of the art stills stored in the database in the data storage unit 14 copied to the initial keyframe 51, which initial keyframe is shown a display terminal at a workstation 16. The colorist pulls a mask with a desired color attribute from the art stills of the shot from the database and applies the mask to the corresponding mask within the frame (generally at block 52). The color and mask information may then be copied (arrow 57) to second frame 53. The color and mask information may need to be slightly edited to fit the second frame, which is now defined as a keyframe. This second keyframe may subsequently be copied to a third frame 53 (as particularly shown in FIG. 4 and represented by block 66), edited or modified, and so on throughout the entire shot. Therefore, based on the information of the keyframes, the computer or processor 12 then interpolates the color and mask information for all of the frames 61 between each of the selected keyframes, thereby rendering all the frames of the shot colorized. The quality of the interpolation may then be immediately checked by playing back the shot (generally at block 62) on the display of the workstation 16 or playing back segments of video to access the color/mask generation. If more keyframes need to be defined to more accurately recolorize the shot, a user may then do so. As each shot is colorized to a satisfactory degree, the shot is stored 68 and compiled onto a master tape in the proper order for the completion of the film or project.

After all the shots of the film are colorized, a quality control process is conducted to ensure that the entire project matches or meets the original design. In order to do so, each shot is balanced for color relationship to the adjacent shots with the quality of the coloring needing to meet a predetermined standard. Further, if need be, broadcast specifications of the edited color master stock must be met. If the colorized digital material meets all the quality standards set in place, the digital shots are laid back to a useable format in the lay back unit 20, either digital-to-digital such as on D1 videotape or digital-to-analog such as celluloid. A time code may also be applied which matches the time code of the original master stock.

In addition to the shape and position of masked objects, linear interpolation may be applied to all other colorization parameters for which it is applicable, including all the values in the color recipes and the mask diffusion levels. This added interpolation capability allows the colorization of shots with changing lighting or focus without the discontinuities that would otherwise result. Precedence values are generally not interpolated, but the relative precedence of objects can change between frames, as in the extreme example of a dance scene. Accommodating such a scene is simply a matter of making sure that when the precedence values of different masks are changed that the individual masks are not in contact in order to avoid any discontinuity.

Polygon Reshaping

According to the present invention, polygon reshaping technology provides a user with the ability to change dynamically the number of points or vertices, thereby changing the number of lines or sides, defining a polygon around an object. An object's shape may change significantly over the course of a shot, or the size of the object changes dramatically within the image while the shape of the masked object stays relatively constant and unchanged (e.g., panning in or out). Either of these situations is capable of affecting the optimum number of points used to define the coloring polygonal mask. The recolorization process of the present invention can interpolate between masks having a different number of points in the defining polygon as long as the points that match are known. For example, a polygon of an object in the background of one frame may have, for example, only five points to accurately define the mask, but as the shot proceeds and the object moves toward the foreground, more and more points are needed to accurately define the polygon to the mask. Therefore, the colorist may copy the polygon having five points to the mask in the desired frame and reshape the polygon, and the compiler 12 interpolates between the frames by adding (or subtracting) points or lines in the polygon as needed.

Figure 6:
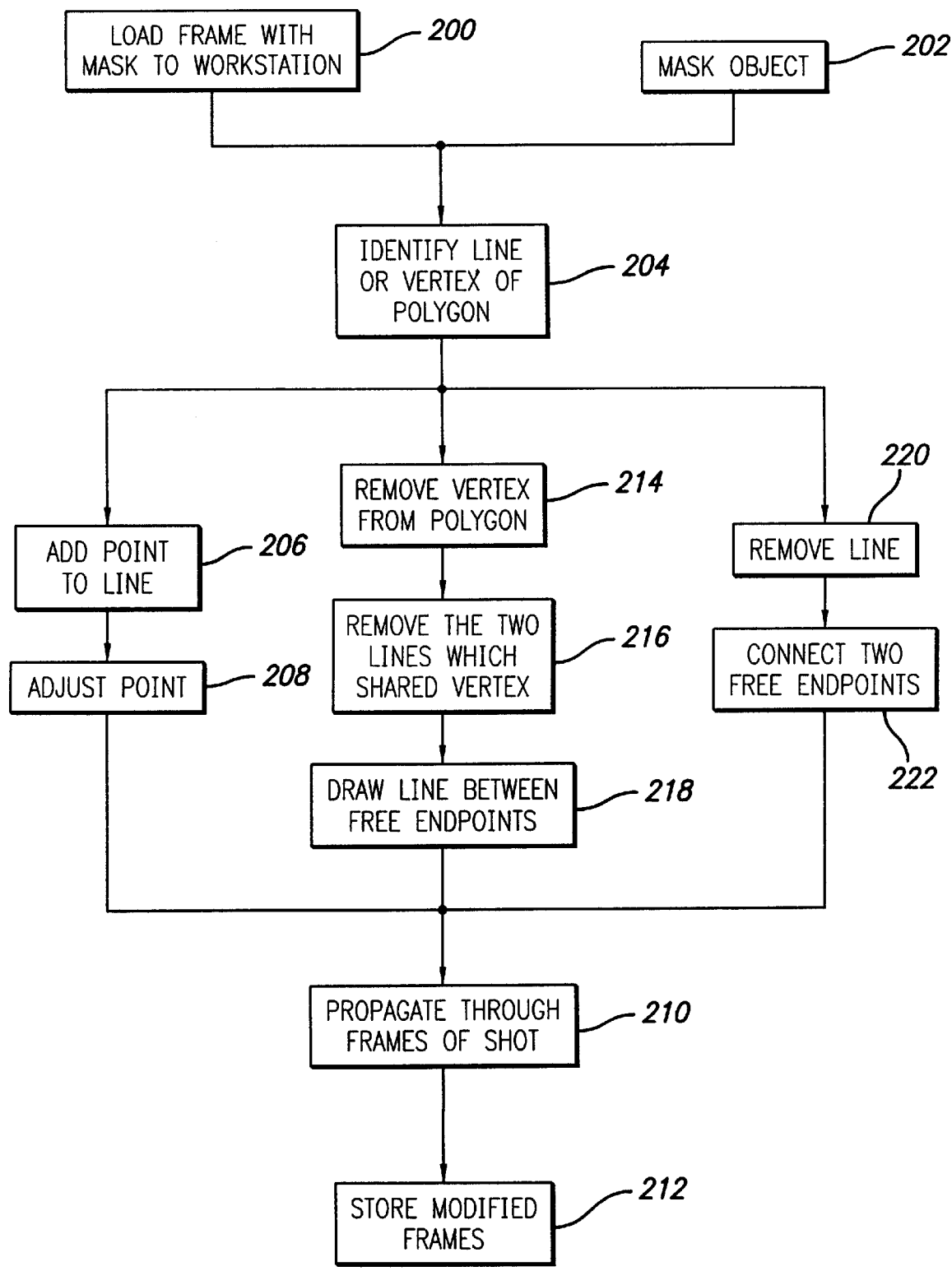
FIG. 6 is a block diagram of a polygon reshaping methods illustrating the principles of the present invention.
Figure 7A:
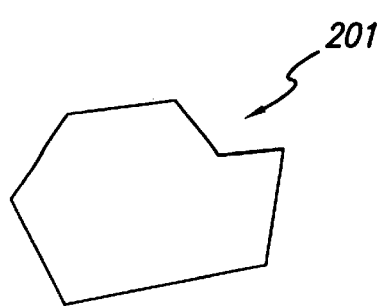
FIGS. 7A–C are schematic views representing the steps of a polygon reshaping method according to the present invention.
Figure 8A:
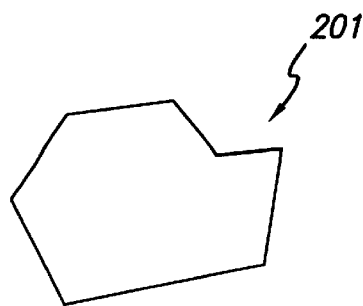
FIGS. 8A–D are schematic views representing the steps of a polygon reshaping method of the present invention.
Figure 7B:
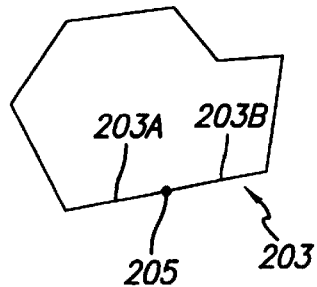
Figure 8B:
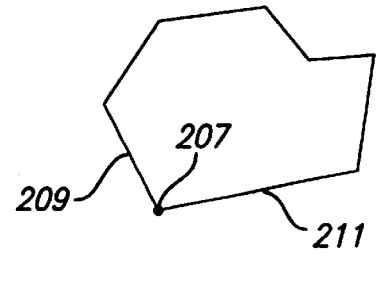
Figure 7C:
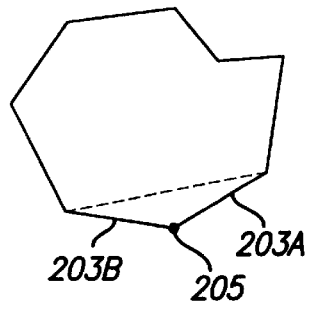

Referring to FIGS. 6 and 7 A–C and expanding upon additional features of reshaping technology, upon either loading a frame with at least one mask or polygon 201 already defined (as shown by block 200) or drawing a polygon 201 around an object in a frame (shown by block 202), a user may add or select a point (shown by block 206), therefore adding a line, to a polygon by identifying an existing line 203 (shown by block 204) of the polygon 201 and selecting the line with, for example, a computer mouse at the user interface workstation 16. A point 205 may be any point along the line 203 or may be automatically assigned to the middle of the line 203, i.e., the midpoint, thereby dividing the line into two new lines 203a, 203b, as shown in FIG. 7B. The point 205 may then be dragged along the line 203, thereby shortening and lengthening the two new lines 203a, 203b accordingly, or dragged to a new position as desired by the user, as particularly shown in FIG. 7C and represented by block 208. The user may then propagate this reshaping through any number of desired frames of the shot (shown by block 210) and, if the desired effect is achieved, store the modified frame or frames in the database (shown by block 212). The propagation step 210 may take place immediately upon selecting the point 205 (block 206), thereby selecting the same point in the same line of the polygon throughout the frames of the shot.

Figure 8C:
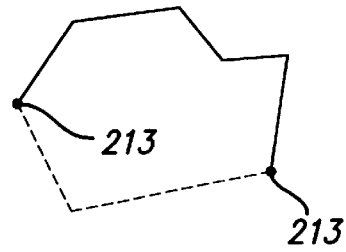
Figure 8D:
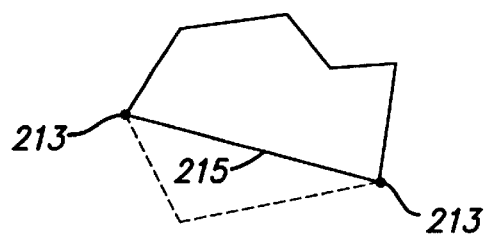

With continued reference to FIG. 6 and additional reference to FIGS. 8A–D, a point or a vertex may also be removed from a polygon 201, thereby removing one of the sides of the polygon 201 (e.g., going from a hexagon to a pentagon), by selecting a point or vertex 207 (shown by block 204) with, for example, a mouse, which point 207 is common to two lines or sides 209, 211 of the polygon 201. When the point 207 is removed (shown by block 214), the lines 209, 211 which shared the common vertex are removed (shown by block 216), and two endpoints 213 of respectively adjacent lines are now free or unconnected, as shown in FIG. 8C. A line 215 is then automatically drawn between the two points 213, as shown in FIG. 8D and represented by block 218 of FIG. 6.

Figure 9A:
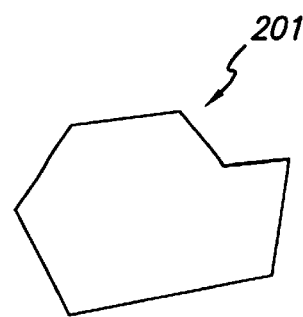
FIGS. 9A–C are schematic views representing the steps of a polygon reshaping method of the present invention.
Figure 9B:
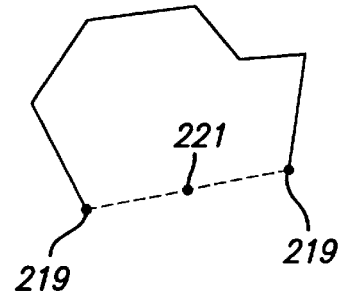
Figure 9C:
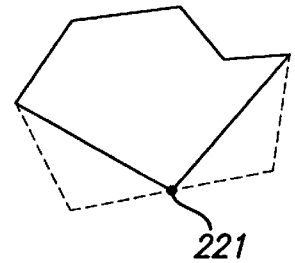

Further, in order to reduce the number of sides of a polygon, instead of removing a single point, an entire line may also be removed. With continued reference to FIG. 6 and additional reference to FIGS. 9A–C, a user selects or identifies a line 217 (block 204), thereby automatically removing the line 217. The two lines which were adjacent to the line 217 that was moved are then automatically joined at their open or free endpoints 219 (shown by block 222) created by the removal of the line 217, as shown in FIG. 9C. In other words, the two lines rotate about their respective vertices and automatically lengthen so that the endpoints 219 may be connected. A new point 221 of the polygon 201 is defined at the point where the two adjacent lines join, which may be the midpoint of the line 217 which was removed (as shown in FIG. 9B) or any other point of the now-removed line 217.

Such polygon modification and reshaping techniques are efficiently enhanced by the automatic propagation feature, as represented by block 210, of the present invention. Once, for example, a point is removed from a line to reduce the number of sides of a polygon, the compiler 12 may automatically perform the same operation on all the frames of that particular shot, thereby saving the user much time and effort, or the use may initiate the propagation. This propagation feature applies to all the reshaping features described herein and shown in FIGS. 7–9, and may be implemented at any time during the reshaping process.

Color-on-color Processing or Picture Recolorization

Color-on-color processing permits colorists under the direction of, for example, the film's director, to recolor or color enhance picture footage previously shot in color. For example, the color of an actor's shirt in a scene may be changed, leaving all other colors untouched. The cost of recolorizing a particular shot with the technology of the present invention is substantially lower than the production costs involved in reshooting an undesirably colored scene.

Figure 5:
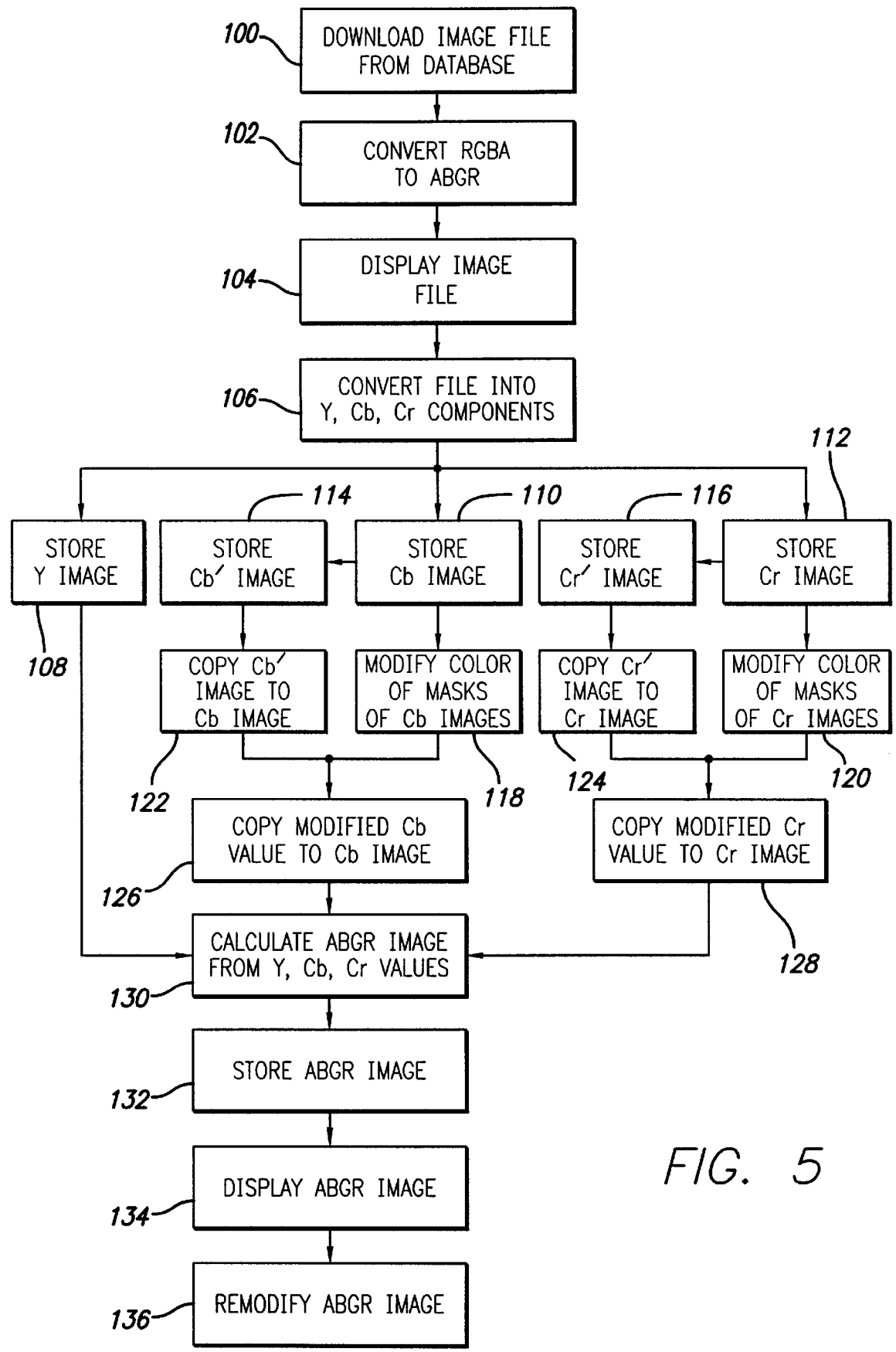
FIG. 5 is a block diagram of a recolorization process illustrating principles of the present invention.

Referring to FIG. 5, a process for modifying digitized color images through the assignment of new chrominance values to the luminance values of the source frame, shot, or picture is illustrated. From one of the workstations 16, a user downloads a digitized image file from the data storage unit 14, as represented by block 100. The source image or image file is generally assumed to be comprised of pixels each of which is stored in Red-Green-Blue-Alpha (RGBA) format. The four components of each pixel or digital unit (i.e., the red component, the green component, the blue component, and the alpha component) may be represented by eight bits each for a total of 32 contiguous bits per pixel.

After the image file is loaded at one of the workstations 16, if the display buffer of the workstation 16 cannot readily accept and directly display an image file in RGBA format, the image file may be converted from the RGBA format into Alpha-Blue-Green-Red (ABGR) format, as represented by block 102. ABGR format allows efficient display of the image on the display monitor of the workstation 16, as shown by block 104.

Upon any necessary image-file conversion and display, each pixel or digital unit of the image file is translated into three different components, namely, luminance, blue chrominance, and red chrominance, which are respectively represented as Y, Cb, and Cr. This conversion process is represented by block 106. After the image file has been converted 106, the respective components are stored as a Y image, a Cb image, and a Cr image in three separate buffers, as represented by blocks 108, 110, and 112, respectively.

At this point in the color-on-color or recolorization process, there are four separate sets of data which a user at a workstation 16 may manipulate: the ABGR (or RGBA) image file, the Y image, the Cb image, and the Cr image. Memory either at the processor 12, the data storage unit 14, or the workstation 16 is now allocated to store copies of the Cb image and the Cr image, which are denoted as the Cb' image and the Cr' image and respectively shown by blocks 114 and 116. This copying step preserves those regions of the individual frame or picture which are not to be manipulated and are to retain their original colors.

The Cb and Cr images may now be modified (blocks 118 and 120, respectively) by adjusting the Cr and the Cb component of the pixels within a polygonal mask to be modified. The Cr and Cb components are adjustable within the range of values mapped from the luminance values of the respective pixels or digital units.

After a user has modified the Cr and Cb images to a desired level in a particular mask area or in any number of mask areas of the images, the data in the Cb' image file and in the Cr' image file are copied to the Cb image file and the Cr image file, respectively, to recreate the original colors of the masks that were not modified, as represented by blocks 122 and 124. At this point, the modified chrominance values of each polygonal mask are copied over the corresponding pixel or digital-unit positions in the Cr and Cb buffers, as shown by blocks 126 and 128, respectively. This combination of the original image and the modified mask or masks leaves for further use the luminance (Y) image, which has not been modified, and the modified blue and red chrominance (Cb and Cr) images, part or all of which chrominance images may have been modified.

The Y, Cr, and Cb values for each pixel or digital unit may then be used to calculate a corresponding ABGR image (block 130) using any well-known algorithm. This now-modified ABGR image may be stored in the database in the data storage unit 14 (block 132) and displayed on a display monitor of one the user's workstation 16 (block 134). If the user deems that the image is in need of further adjustment or modification, the ABGR image may then be remodified (block 136) by repeating the above-described steps from either block 100 or block 106.

Accordingly, the color-on-color processing or picture recolorization technology of the present invention enables a colorist to alter or modify existing colors of films, repair damaged color films, edit colors of a specific shot of a film, create special effects with color modification, and/or otherwise enhance footage of pictures previously shot in color.

The foregoing detailed description has focussed on exemplary embodiments which generally illustrate the principles of recolorization technology of the present invention, with a number of preferred or advantageous variations being provided. However, as previously mentioned, from the foregoing teachings those skilled in the art will realize obvious modifications and variations of the recolorization processes and technology. Accordingly, these alternative embodiments are also within the principles of the present invention as defined by the appended claims.

What is claimed is:

1. A method for reshaping a polygonal mask located on a digitized frame of picture stock including a plurality of digitized frames, the method comprising the steps of:

a. identifying polygon mask to be modified on the frame;

b. selecting one of the lines which comprise the polygon mask;

c. selecting a point on the selected line, thereby defining a new line on each side of the point;

d. dragging the point away from the selected line, thereby defining an angle between the new lines; and automatically performing steps a–d for a corresponding polygon mask in another digitized frame of the picture stock.

2. A method for reshaping a polygonal mask located on a digitized frame of picture stock including a plurality of digitized frames, the method comprising the steps of:

a. identifying said polygon mask to be modified on the frame;

b. selecting one of the lines which comprise the polygon mask;

c. removing the selected line, thereby defining two free endpoints of the lines adjacent to the removed line;

d. connecting the two endpoints at a point which was one of the points of the removed line; and automatically performing steps a–d for a corresponding polygon mask in another digitized frame of picture stock.

3. A method for reshaping a polygonal mask located on a digitized frame of picture stock including a plurality of digitized frames, the method comprising the steps of:

a. identifying said polygon mask to be modified on the frame;

b. selecting one of the vertices which comprise the polygon mask, the selected vertex being common to two lines;

c. removing the two lines to which the selected vertex is common, thereby defining two free endpoints of the two lines which were respectively adjacent the two removed lines;

d. drawing a new line between the two endpoints; and automatically performing steps a–d for a corresponding polygon mask in another digitized frame of the picture stock.

4. A method for masking a selected object on a digitized frame pertaining to a motion picture for the purpose of editing said selected object, said method comprising the steps of:

a. identifying a polygon mask to be modified on the frame;

b. selecting one of the lines which comprise the polygon mask;

c. selecting a point on the selected line, thereby defining a new line on each side of the point;

d. dragging the point away from the selected line, thereby defining an angle between the new lines, to form a modified polygon mask that circumscribes the selected object;

automatically performing steps a–d for a corresponding polygon mask in another digitized frame of the picture stock.

5. A method for masking a selected object on a digitized frame pertaining to a motion picture for the purpose of editing said selected object, said method comprising the steps of:

a. identifying a polygon mask to be modified on the frame;

b. selecting one of the lines which comprise the polygon mask;

c. removing the selected line, thereby defining two free endpoints of the lines adjacent to the removed line;

d. connecting the two endpoints at a point which was one of the points of the removed line to form a modified polygon mask that circumscribes the selected object; and automatically performing steps a–d for a corresponding polygon mask in another digitized frame of the picture stock.

6. A method for masking a selected object on a digitized frame pertaining to a motion picture for the purpose of editing said selected object, said method comprising the steps of:

a. identifying a polygon mask to be modified on the frame;

b. selecting one of the vertices which comprise the polygon mask, the selected vertex being common to two lines;

c. removing the two lines to which the selected vertex is common, thereby defining two free endpoints of the two lines which were respectively adjacent the two removed lines; and d. drawing a new line between the two endpoints to form a modified polygon mask that circumscribes the selected object; and automatically performing steps a–d for a corresponding polygon mask in another digitized frame of the picture stock.

* * * * *